Oct. 7, 1969   E. R. KROEGER   3,470,987
MAGNETICALLY RELEASED FRICTION BRAKE
Filed Dec. 26, 1967
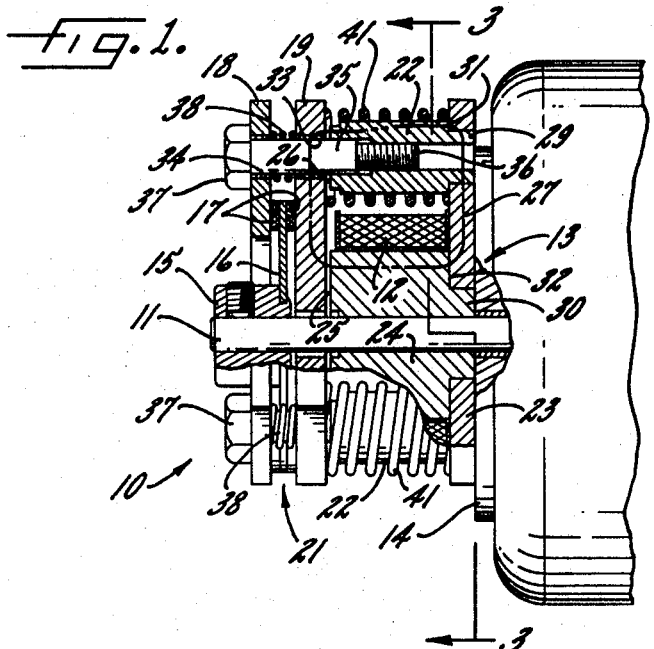
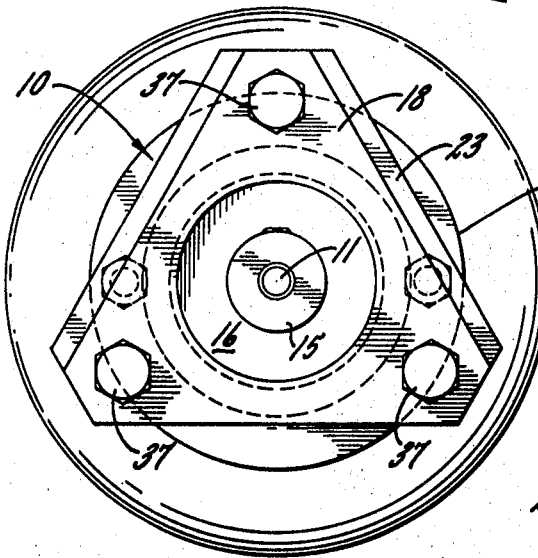
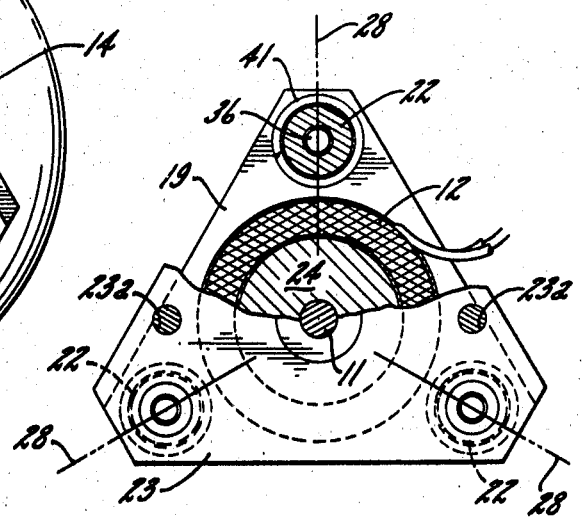
INVENTOR.
EDWARD R. KROEGER,
BY Wolfe, Hubbard, Voit & Osann
ATTORNEYS.

United States Patent Office 3,470,987
Patented Oct. 7, 1969

3,470,987
MAGNETICALLY RELEASED FRICTION BRAKE
Edward R. Kroeger, Beloit, Wis., assignor to Warner Electric Brake & Clutch Company, South Beloit, Ill., a corporation of Delaware
Filed Dec. 26, 1967, Ser. No. 693,588
Int. Cl. F16d 55/38; B60t 13/04
U.S. Cl. 188—171                                         7 Claims

ABSTRACT OF THE DISCLOSURE

The magnetic core of a spring applied brake comprises parallel pole pieces projecting from a non-rotatable plate and angularly spaced around a center pole piece supporting a winding for causing flux to thread angularly spaced toroidal paths through the pole pieces, the plate and an armature disk to draw the latter to the pole faces. Compression springs surrounding the outer pole pieces act when the winding is deenergized to press the armature away from the pole faces and apply a multiple disk friction brake.

Background of the invention

This invention relates to a disk type friction brake which is applied by spring pressure exerted on an armature forming part of a toroidal flux path and drawn to brake-released position by energization of a winding disposed between the inner and outer poles of a generally U-shaped core.

Summary of the invention

A novel construction of the magnet core and arrangement of brake-applying springs thereon provides optimum overall compactness and permits the parts of the magnet core to be of simple and inexpensive construction and assembled at low cost. For this objective, compression springs encircle pole pieces angularly spaced around the brake axis and projecting from a supporting plate having a center pole piece cooperating with the outer pieces, the plate, and an armature disk at opposite ends of the pole pieces to form angularly spaced endless paths for the flux created by a winding surrounding the center pole and encircled by each of the paths which constitute parts of a toroid. Axial movement of the armature disk by the springs applies a multiple disk friction brake which is released as the armature is attracted to the ends of the pole pieces when the magnet is energized.

Brief description of the drawings

FIGURE 1 is a side view, partly in diametrical cross-section, of a friction brake embodying the novel features of the present invention.

FIG. 2 is a left side view.

FIG. 3 is a fragmentary section taken along the line 3—3 of FIG. 1.

Description of the preferred embodiment

The invention is shown in the drawings incorporated in a multiple disk type friction brake 10 adapted for convenient mounting on the end bell 14 of an electric motor and to apply a retarding torque to the motor shaft 11 in response to deenergization of a multiple turn winding 12 in a magnetic core 13. The latter includes a flat plate 23 having holes 23a therein through which screws may be extended to clamp the plate to the end bell 14. Herein the brakec comprises a hub 15 coupled on the shaft 11 and fixed to a disk 16 disposed between rings 17 of friction material secured to the opposed faces of a stationarily centrally apertured plate 18 and a non-rotatable disk 19 constituting the armature 21 of the magnet by which the brake is released.

In accordance with the present invention, the magnet core comprises a plurality, three herein, of parallel pole pieces in the form of studs 22 projecting rigidly from the outer periphery of the supporting plate 23 and angularly spaced around a center stud and pole piece 24 projecting rigidly from the plate along the axis thereof. The end faces 25, 26 of the center and outer pieces are flush with each other and disposed adjacent the flat face of the armature disk 19 which cooperates with the pole pieces 22 and 24 and the plate 23 to form three endless flux paths 27 disposed in radial planes 28 angularly spaced around the brake axis. These paths constitute parts of a toroid concentric with the brake axis.

The ends 29 and 30 of the pieces 22 and 24 opposite the pole faces are of reduced diameter and pressed into holes in the plate 23 to bring shoulders 31, 32 thereon into abutment with the plate and thereby join the latter and the pole pieces into a rigid core structure. The non-rotatable disks 18 and 19 of the brake are formed with holes 33 and 34 alined with the pole pieces 22 and slidably receiving extensions of these pieces in the form of pins 35 which are smaller and project beyond the end faces 26 thereof. Preferably these pins take the form of screws threaded into the pole face ends of the pieces and locked therein by screws 36 threaded into the plate ends of these pieces. The outer brake disk 18 abuts against the heads 37 of the screws and forms an abutment for light compression springs 38 encircling the pins and acting to hold the disk 18 against the abutments 37.

Coiled compression springs 41 for applying the brake 10 when the winding 12 is deenergized are, in accordance with the present invention, supported by the outer pole pieces 22. They are coiled loosely around these pieces with one end abutting the armature disk 19 around the holes 33 therein, the other end abutting the plate 23. The magnet winding 12 which is an annulus shorter than the central pole piece 24 encircles and is secured as by adhesive to this piece.

In operation and when the winding is deenergized, the armature 19 is pressed away from the pole faces 25, 26 and into gripping engagement with the disk 16 with the latter backed by the disk 18. The retarding torque thus derived frictionally is transmitted by the hub 15 to the shaft 11. When the winding is energized, the force of the springs is overcome and the armature 19 is drawn toward and into abutment with the pole faces 25, 26 by the action of the flux threading the paths 27 above described. The brake is thus released and so remains so long as the energization of the winding is maintained.

By dividing the flux developed by the winding into a plurality of parts threading the angularly spaced paths 27 above described, it is possible to utilize the pole pieces 22 of the magnet core to perform the additional function of supporting the brake-applying springs 41. The latter are thus disposed in the plane of the winding 12 thereby providing optimum axial compactness of the overall structure. Moreover, several of the metal parts may be made as sheet metal stampings and the others are simple and inexpensive to construct and assemble to form a complete magnetically-released brake unit easily mountable and coupled to an output shaft of an electric motor or other device whose motion is to be controlled.

I claim:

1. A friction brake of the character described having, in combination, a magnetic core having a center pole piece providing a pole facing axially, outer pole pieces radially spaced from and angularly around said center pole piece and providing end faces flush with each other and the end face of said center piece, an armature disk supported adjacent said pole faces by parallel axial extensions of said outer pole pieces projecting beyond the pole faces thereof, an annular winding between said center and outer pole pieces, means supporting said pole pieces to form flux paths disposed in radial planes and encircling said winding and angularly spaced around said axis, each of said paths including said armature disk, said center pole piece and one of said outer pole pieces, an axially fixed second disk supported by said extensions and axially spaced from said armature disk, a third disk rotatably supported between said armature and second disks and cooperating therewith to form a friction disk brake for resisting turning of said third disk, and compression springs coiled around said outer pole pieces and continuously urging said armature disk axially to apply said brake when said winding is deenergized, the force of said springs being overcome by attraction of said armature disk toward said pole faces when said winding is energized.

2. A friction brake as defined in claim 1 in which said pole piece supporting means is a plate and said center and outer pole pieces are studs projecting therefrom.

3. A friction brake as defined in claim 2 in which said studs are shouldered and pressed into holes angularly spaced around said plate.

4. A friction brake as defined in claim 3 in which said extensions are parallel pins on said studs projecting through said outer pole faces.

5. A friction brake as defined in claim 4 in which said pins comprise screws extending through the outer pole faces and threaded into the ends of said studs.

6. A friction brake as defined in claim 4 in which heads on said pins abut said second disk and fix the axial position thereof.

7. A friction brake as defined in claim 4 in which said pins project through alined pairs of holes angularly spaced around the peripheries of said armature and second disks.

References Cited

UNITED STATES PATENTS

| 2,368,317 | 1/1945 | Meyer et al. | 188—171 |
| 2,700,439 | 1/1955 | Hodgson | 188—171 |
| 2,949,172 | 8/1960 | Simons | 188—171 |
| 2,974,756 | 3/1961 | Roehm | 188—171 |

DUANE A. REGER, Primary Examiner

U.S. Cl. X.R.

188—71